United States Patent

Churchill et al.

[11] Patent Number: 5,940,937
[45] Date of Patent: Aug. 24, 1999

[54] DUAL DIRECTIONAL HINGED WALLMOUNT BRACKET ASSEMBLY

[75] Inventors: Robert J. Churchill; Jose Garcia Reyes, both of San Jose, Calif.

[73] Assignee: Siemens Information and Communication Networks, Inc., Boca Raton, Fla.

[21] Appl. No.: 08/878,523

[22] Filed: Jun. 19, 1997

[51] Int. Cl.⁶ ............................... E05D 5/00; E05D 7/00
[52] U.S. Cl. ............................... 16/382; 16/365; 16/366; 16/229
[58] Field of Search ............................... 16/382, 365, 366, 16/229–232, 262, DIG. 23; 49/193, 382; 312/223.1, 223.2, 223.4, 245, 326, 248, 235.6

[56] References Cited

U.S. PATENT DOCUMENTS

| | | | |
|---|---|---|---|
| 3,654,663 | 4/1972 | Algotsson | 16/232 |
| 3,949,445 | 4/1976 | Stevens | 16/262 |
| 4,486,919 | 12/1984 | Schoenke . | |
| 4,495,673 | 1/1985 | Khan | 16/232 |
| 4,667,367 | 5/1987 | White et al. . | |
| 4,729,612 | 3/1988 | Stone . | |
| 5,158,503 | 10/1992 | Mitchell . | |
| 5,171,078 | 12/1992 | Oslin et al. | 49/193 |
| 5,327,684 | 7/1994 | Herbst | 16/382 |
| 5,530,992 | 7/1996 | Baermann . | |
| 5,561,886 | 10/1996 | Flamme . | |
| 5,624,170 | 4/1997 | Hasty | 16/382 |

*Primary Examiner*—Chuck Y. Mah

[57] ABSTRACT

A wall-mounting apparatus is provided for mounting a cabinet (20) upon a wall. The apparatus includes a wallmount bracket (12) for mounting on the wall, the wallmount bracket (12) having first and second wallmount hinge pin conduits (42, 44) disposed along opposite edges thereof. A first hinge pin assembly (18) is longitudinally disposed in the first hinge pin conduit (42) and a second hinge pin assembly (18) is longitudinally disposed in the second hinge pin conduit (44). A first side bracket (14), attachable to the cabinet at one end, has at an opposite end a first hinge pin pipe (51) substantially encircling a portion of the first hinge pin assembly (18) such that the first side bracket (14) is generally rotatable about the first hinge pin assembly (18) with respect to the wallmount bracket (12). A second side bracket (16), attachable to the cabinet at one end, has at an opposite end a second hinge pin pipe (61) substantially encircling a portion of the second hinge pin assembly (18) such that the second side bracket (16) is generally rotatable about the second hinge pin assembly (18) with respect to the wallmount bracket (12).

18 Claims, 6 Drawing Sheets

DUAL DIRECTIONAL HINGED WALLMOUNT BRACKET ASSEMBLY

BACKGROUND OF THE INVENTION

The invention relates generally to wall-mounted bracket assemblies, and more particularly to a dual direction hinged wall-mounted bracket assembly.

Telephone switching equipment often includes a plurality of switches and associated structure housed in one or more cabinets. Due to space restrictions, many customers of such systems prefer the cabinetry to be mountable to a wall. Thus, wall-mounted brackets are widely employed to securely attach cabinets containing telephone switching equipment to appropriate walls.

As telephone switching has become more complex due to the proliferation of telephone numbers in the age of intraoffice networks, facsimile machines, internet access and the like, an increased need to congregate different types of switching equipment has arisen. To meet this need, it has become increasingly customary to array numerous cabinets containing switching equipment onto a single wall to facilitate their mutual intercommunication. The ever-increasing demands of communication technology continue to press current space restrictions and force more elaborate configurations of telephone switching equipment and cabinetry.

The cabling associated with most telephone switching equipment cabinets emanates from the rear of the cabinets. In known installations of such telephone switching equipment, the entire cabinet must be removed from the associated walls in order to access the cabling. This can be a time consuming and cumbersome task. Because of the need to access telephone switching cabling, in order to repair or reconfigure the switching systems, there is a need to provide unimpaired access to the cabling at the rear of such wall-mounted telephone switching equipment cabinetry.

SUMMARY OF THE INVENTION

The present invention satisfies this need and includes a wall-mounting apparatus for mounting a cabinet upon a wall, the apparatus including a wallmount bracket and two brackets mounted directly on the cabinet adapted to be removably hinged to opposite sides of the wallmount bracket by corresponding hinge pin assemblies.

Normally the hinge pin assemblies are used to secure the brackets mounted directly to the cabinet to the wallmount bracket. In order to facilitate access to the rear cabling, however, either of the hinge pin assemblies may be removed to provide clockwise or counterclockwise rotation of the cabinet away from the wall, depending upon which hinge pin assembly is removed.

DETAILED DESCRIPTION OF PREFERRED EMBODIMENTS

Figure 6:
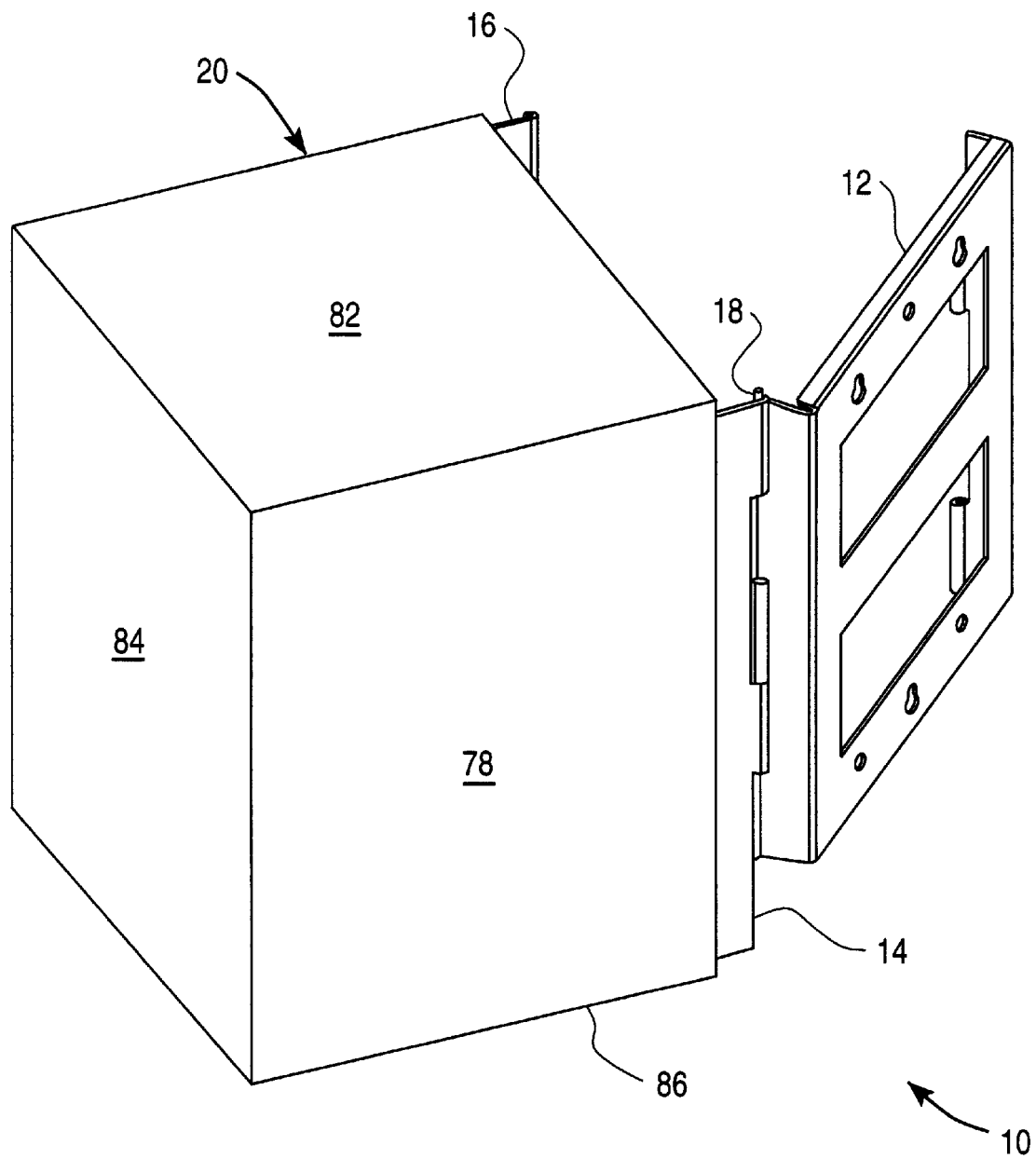
FIG. 6 is a perspective view of an embodiment of the invention with the cabinet rotated open about the right hinge pin assembly.

Referring to the drawings generally, and especially to FIG. 6, an embodiment of the inventive wall-mounting apparatus for mounting a cabinet 20 to a wall is shown. The apparatus 10 includes a generally rectangular wallmount bracket 12 adapted to be mounted to a wall. The wallmount bracket 12 is attachable along opposite edges to a right side cabinet bracket 14 (FIG. 1) and a left side cabinet bracket 16 (FIG. 2). The right and left side cabinet brackets, in turn, are adapted to be attached to the cabinet 20 to secure the right and left side brackets 14 and 16 to the wallmount 12. Alternative embodiments of the invention may differ to accommodate structural differences inherent in mounting other types of host cabinets.

Figure 3:
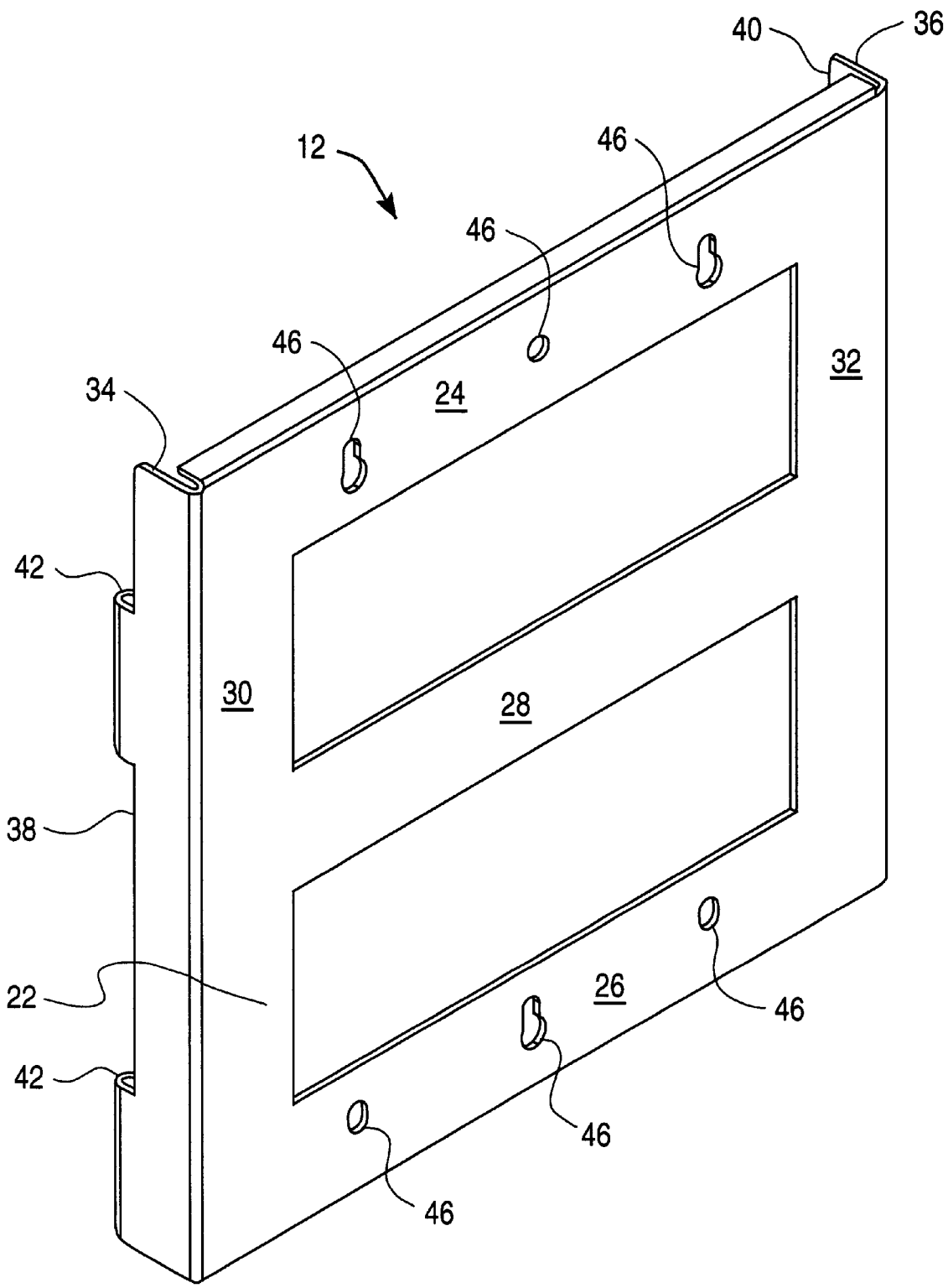
FIG. 3 is a perspective view of a wallmount bracket in accordance with an embodiment of the invention.

Referring now to FIG. 3, the wallmount bracket 12 is shown in more detail. The wallmount bracket 12 includes a generally rectangular back plane 22 having right and left vertical portions, 30 and 32 respectively, transversed by top crossbar 24, bottom crossbar 26, and central crossbar 28. The right vertical portion 30 extends around a perpendicular bend into right flange 34 which ends at the right edge 38 of the wallmount bracket 12. Along the right edge 38 are disposed right tubular retainers 42. Similarly, the left vertical portion 32 of the wallmount bracket 12 extends around a substantially perpendicular bend into left flange 36 which extends to the left edge 40 of the wallmount bracket 12. Left tubular retainers 44 are disposed along the left edge 40 of the wallmount bracket 12.

The wallmount bracket 12 may have one or more holes therein for use in mounting the wallmount bracket 12 to a wall, and a plurality of wall-mounting holes 46 are distributed across the top and bottom crossbars 24 and 26 respectively, of the wallmount bracket 12. The wallmount bracket 12 may be used as a screw-marking template, wherein the bracket 12 is placed against the wall and holes are drilled through the appropriate template holes for subsequent mounting.

Figure 1:
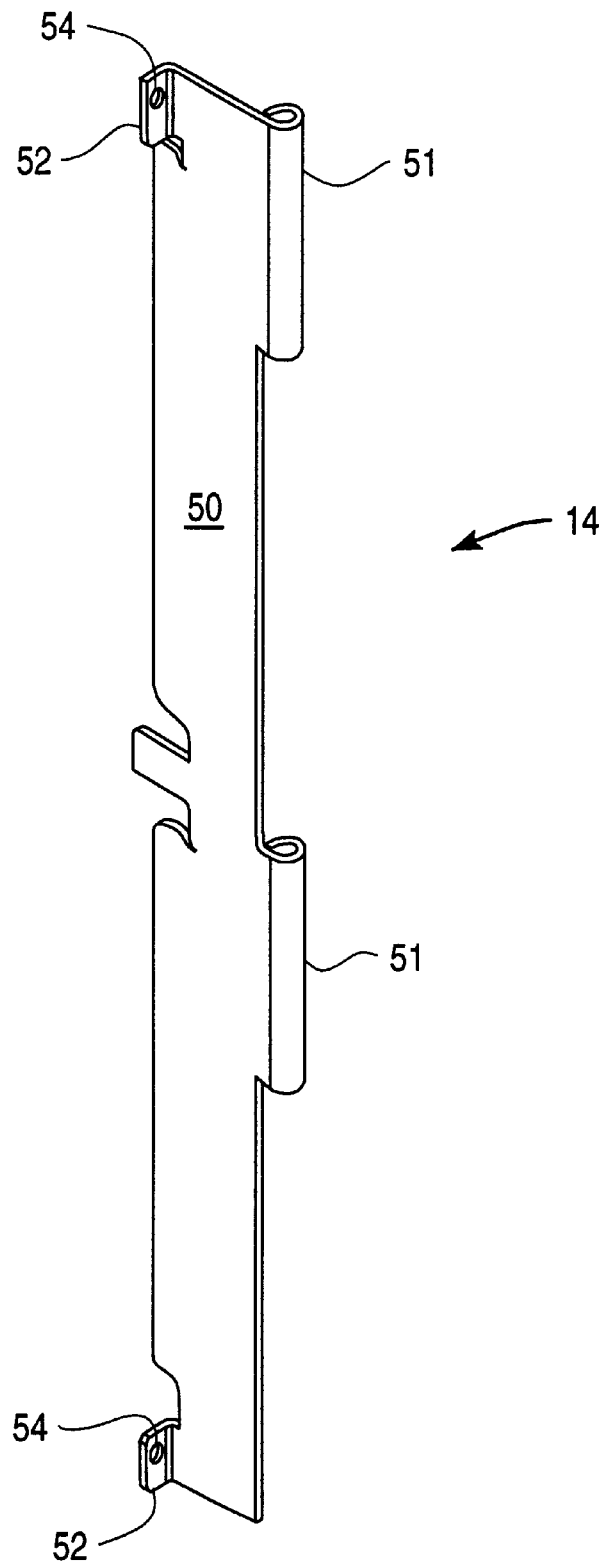
FIG. 1 is a perspective view of a right side cabinet bracket in accordance with an embodiment of the invention.
Figure 2:
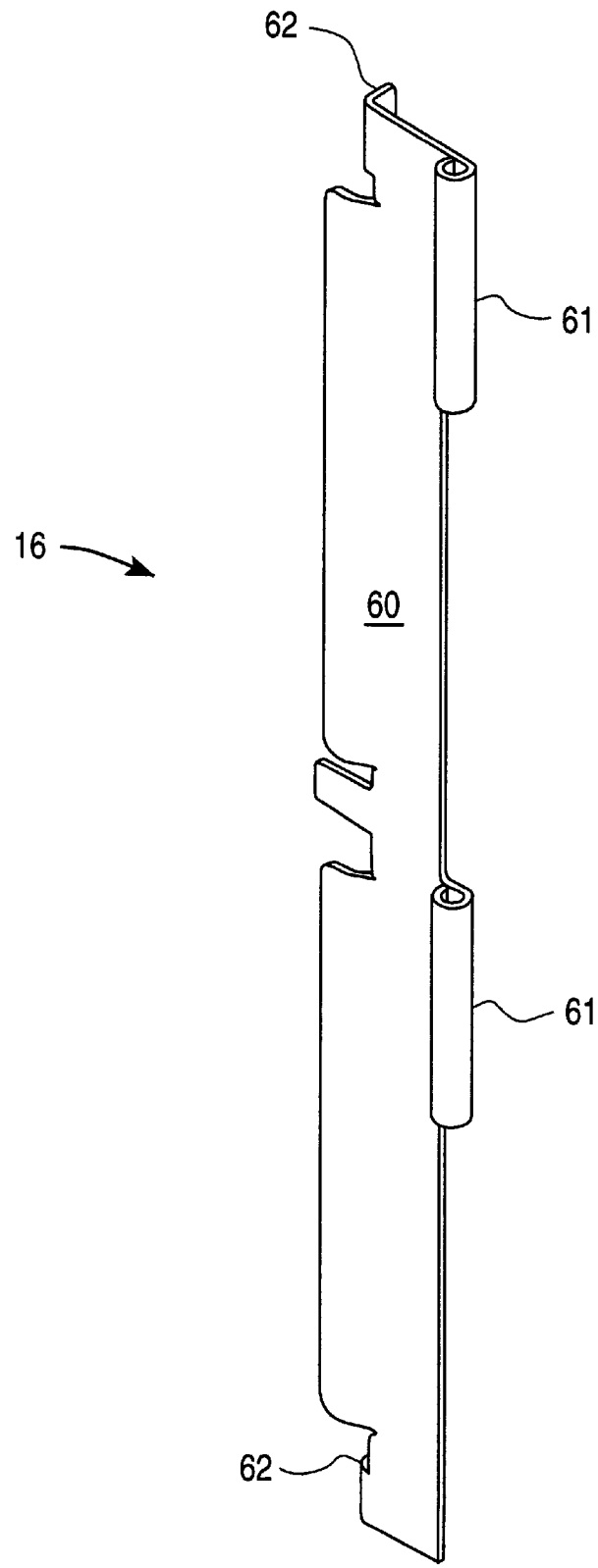
FIG. 2 is a perspective view of a left side cabinet bracket in accordance with an embodiment of the invention.

Referring now to FIG. 1, the right side cabinet bracket 14 is shown in more detail. The right side cabinet bracket 14 includes a substantially rectangular planar body 50 having along one longitudinal edge a pair of right tubular retaining pipes 51 mutually forming a right hinge pin conduit. Along the opposite longitudinal edge, near the corners of the rectangular body 50 are two small tabs 52 bent substantially perpendicular to the body 50, the tabs 52 each containing a connecting hole 54 for use in connecting the right side bracket 14 to the cabinet 20.

Referring now to FIG. 2, the left side cabinet bracket 16 is shown in more detail. The left side cabinet bracket 16 includes a substantially rectangular planar body 60 having along one longitudinal edge a pair of left tubular retaining pipes 61 mutually comprising a left hinge pin conduit. Along the opposite longitudinal edge, near the corners of the rectangular body 60 are two small tabs 62 bent substantially perpendicular to the body 60, the tabs 62 each containing a connecting hole 64 (not shown in FIG. 2) for use in connecting the left side bracket 16 to the cabinet 20. The left side bracket 16 may be symmetrical to right side bracket 14.

Figure 4:
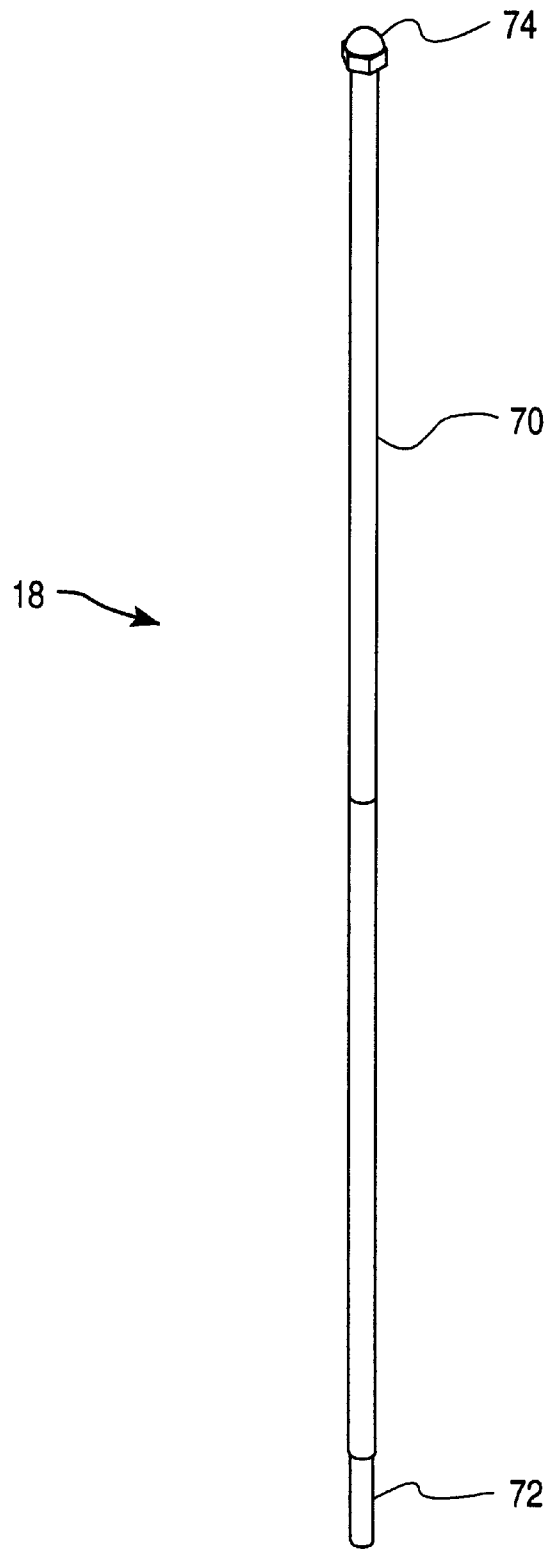
FIG. 4 is a perspective view of a hinge pin assembly in accordance with an embodiment of the invention.
Figure 5:
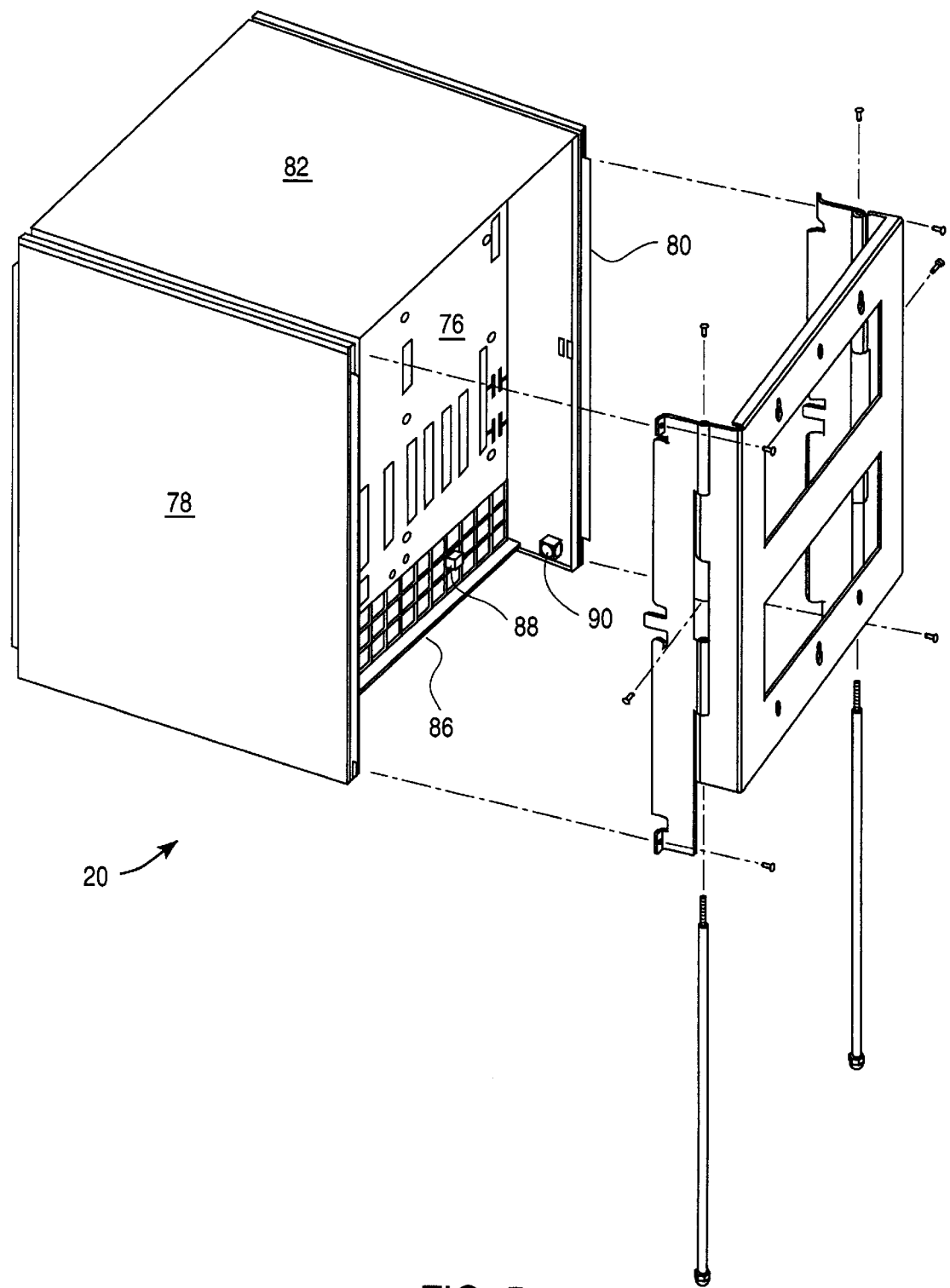
FIG. 5 is an exploded perspective view of an embodiment of the invention.

In order to connect the right and left side brackets to the wallmount bracket 12, hinges are formed therebetween by inserting hinge pin assemblies 18 (FIG. 4) through the properly aligned components. Specifically, to attach the right side cabinet bracket 14 to the wallmount bracket 12, the tubular retaining pipes 51 of the right side bracket are placed in staggered collinear disposition with the right tubular retainers 42 of the wallmount bracket 12, as shown in FIGS. 5 and 6. The hinge pin assembly 18 is then inserted through the segmented circular tunnel(s) formed by the collinear placement of the retaining pipes 51 and the tubular retainers 42. The components may form a single continuous tunnel or a series of more than one coaxially aligned tunnels. The hinge pin assembly 18 may have a narrowed entry end 72 for facilitating manual insertion of the hinge pin assembly 18 into the tunnel(s). The shaft 70 of the hinge pin assembly spans the length of the tunnel(s) once the assembly 18 is completely inserted, and the head 74 of the hinge pin assembly retains the assembly in place by being too wide to fit into the tunnel(s) and resting atop the uppermost segment of the tunnel(s). Furthermore, the hinge pin assembly may be furnished with a slot for the insertion of an M5 retaining ring to facilitate retaining the hinge pin apparatus in place.

Similarly, to attach the left side cabinet bracket 16 to the wallmount bracket 12, the tubular retaining pipes 61 of the left side bracket are placed in staggered collinear disposition with the left tubular retainers 44 of the wallmount bracket 12, as is shown in FIGS. 5 and 6. The hinge pin assembly 18 is then inserted through the segmented circular tunnel(s) formed by the collinear placement of the retaining pipes 61 and the tubular retainers 44.

When mounting one apparatus in accordance with the invention vertically adjacent to another such apparatus, it is generally preferable to insert the hinge pin assemblies from opposite directions (i.e. from the top of the upper apparatus and from the bottom of the lower apparatus) so that the hinge pin assemblies may be removed without interference from the adjacent apparatus. Referring now to FIGS. 5 and 6, the cabinet 20 is shown in more detail. The cabinet is substantially rectangular- or cube-shaped and has six surfaces forming its exterior structure. The front surface 84 is the surface most remote from the wall when the cabinet is in mounted position. The right and left side surfaces 78 and 80, respectively, correspond to right and left side brackets 14 and 16, respectively, and are attached to the corresponding bracket during mounting. The top and bottom surfaces 82 and 86, respectively, provide further support for the cabinet and the telephone switching equipment housed therein. Notably, the bottom surface 86 is shorter than the top surface 82, as seen in FIG. 5, and extends only to the inwardly disposed rear surface 76 of the cabinet as seen in that figure. The relatively inwardly placed rear surface 76 permits side surfaces 78 and 80 to protrude, thereby facilitating attachment to the side cabinet brackets 14 and 16.

Specifically, the right side surface 78 of the cabinet 20 is attached at the connecting holes 54 of the right side cabinet bracket 14. Similarly, the protruding left side surface 80 of the cabinet 20 is connected at the connecting holes 64 of the left side cabinet bracket 16. Connecting studs 90, or other types of connection facilitators, are preferably disposed on the interior surface of right and left side surfaces 78 and 80 to interengage with the connecting holes and/or tabs of the corresponding side brackets. Two M4 self-tapping screws may be used to attach the side brackets to the protruding side surfaces of the cabinet 20.

The rear surface 76 of the cabinet 20 also may include an opening 88 for permitting cabling associated with the telephone switching equipment to pass therethrough, under the bottom crossbar 26 of the wallmount bracket 12, to other telephone switching equipment mounted nearby on the wall or to associated hardware behind the wall.

The inventive wall-mounting apparatus provides for dual directional hinged rotation of the cabinet containing the telephone switching equipment. As proximately mounted cabinets, related equipment, or adjacent walls may inhibit the translation or rotation of a particular cabinet in one or more directions, the dual directional feature provides considerably more flexibility for locating the cabinet and other related equipment so as to provide improved access to the rear cabling.

While the cabinet 20 is relatively constrained to the mounting wall by the attached pair of side cabinet brackets and wallmount bracket, removal of one of the hinge pin assemblies 18 from its corresponding tunnel(s) of tubular retainers and retaining pipes detaches the particular side cabinet bracket from the wallmount bracket 12 at that point, and permits the cabinet 20 to be rotated about the other hinge pin assembly 18 still in place, to increase access to the rear of the cabinet 20 and to any cabling emanating from the cable opening 88 of the cabinet 20. Thus, the rear of the cabinet may be accessed from either side of the cabinet depending upon which hinge pin assembly is removed. In one embodiment, once the appropriate hinge pin has been removed, the cabinet should be able to be rotated at least 45° from the wall to enable sufficient access to the rear of the cabinet.

From the foregoing, it will be appreciated that the invention provides a novel wall-mountable telephone switching apparatus permitting dual direction rotation of a cabinet thereon and a method for attaching such a telephone switching cabinet to a wall. The invention is not limited to the embodiments described herein, or to any particular embodiments. Specific examples of alternative embodiments considered to be within the scope of the invention include embodiments wherein the hinges are horizontally disposed at the top and bottom of the wallmount bracket and embodiments where the connective elements of the apparatus may be differently configured or oriented. Also, the invention contemplates differently shaped wallmount, right side cabinet, and left side cabinet brackets. For example, the wallmount bracket may, in accordance with the claimed invention, comprise a plurality of non-integrated structures separately mountable to the wall or to each other. Other modifications to the described embodiments may also be made within the scope of the invention. The invention is defined by the following claims.

What is claimed is:

1. A wall-mounting apparatus for mounting a cabinet upon a wall, said cabinet having a rear side for generally facing said wall upon mounting, said apparatus comprising:

a wallmount bracket-for mounting on said wall, said wallmount bracket including first and second wallmount hinge pin conduits disposed along opposite edges thereof;

a first hinge pin assembly disposed in said first hinge pin conduit;

a second hinge pin assembly disposed in said second hinge pin conduit;

a first side bracket attachable to said cabinet at one end and having at an opposite end a first hinge pin pipe substantially encircling a portion of said first hinge pin assembly such that said first side bracket is generally rotatable about said first hinge pin assembly with respect to said wallmount bracket; and a second side bracket spaced apart from said first side bracket attachable to said cabinet at one end and having at an opposite end a second hinge pin pipe substantially encircling a portion of said second hinge pin assembly such that said second side bracket is generally rotatable about said second hinge pin assembly with respect to said wallmount bracket.

2. A wall-mounting apparatus in accordance with claim 1 wherein each of said first and second side brackets is configured to be attachable to said cabinet.

3. A wall-mounting apparatus in accordance with claim 2 wherein one of said hinge pin assemblies may be removed from its corresponding hinge pin conduit to permit unconstrained rotation of said cabinet generally away from said wall about the other of said hinge pins assemblies.

4. A wall-mounting apparatus in accordance with claim 1 wherein said first and second hinge pin conduits are defined by a plurality of tubular retainers having substantially collinear central axes.

5. A wall-mounting apparatus in accordance with claim 1 wherein said cabinet may be rotated at least about 45° in either of two opposite directions depending upon which one of said first and second hinge pin assemblies is removed from its corresponding hinge pin conduit.

6. A wall-mounting apparatus for mounting a cabinet upon a wall, said cabinet having a rear side for generally facing said wall upon mounting, said apparatus comprising:
 a wallmount bracket for mounting on said wall, said wallmount bracket including first and second wallmount hinge pin conduits disposed along opposite edges thereof;
 a first hinge pin assembly disposed in said first hinge pin conduit;
 a second hinge pin assembly disposed in said second hinge pin conduit;
 a first side bracket attachable to said cabinet at one end and having at an opposite second end a first hinge pin pipe substantially encircling a portion of said first hinge pin assembly such that said first side bracket is general rotatable about said first hinge pin assembly with respect to said wallmount bracket; and
 a second side bracket attachable to said cabinet at one end and having at an opposite end a second hinge pin pipe substantially encircling a portion of said second hinge pin assembly such that said second side bracket is generally rotatable about said second hinge pin assembly with respect to said wallmount bracket, wherein each of said side brackets are generally planar and have tabs disposed substantially perpendicularly therefrom to facilitate attaching to said cabinet.

7. A wall-mountable telephone switching apparatus comprising:
 a wallmount bracket for mounting on a wall, said wallmount bracket including first and second wallmount hinge pin conduits disposed along opposite edges thereof;
 first and second hinge pin assemblies disposed in said first and second hinge pin conduits, respectively;
 first and second side brackets having proximate and remote ends, each of said brackets having at its proximate end a hinge pin pipe substantially encircling portions of said corresponding hinge pin assemblies such that said side brackets are generally rotatable about said corresponding hinge pin assemblies with respect to said wallmount bracket; and
 a cabinet containing telephone switching equipment therein, said cabinet being attachable to at least one of said side brackets at its corresponding remote end.

8. A wall-mountable telephone switching apparatus in accordance with claim 7 wherein said cabinet is attached to each of said first and second side brackets.

9. A wall-mountable telephone switching apparatus in accordance with claim 8 wherein said cabinet may be unconstrained to permit rotation about one of said hinge pin assemblies and generally away from said wall by the removal of the other of said hinge pin assemblies from its corresponding hinge pin conduit.

10. A wall-mountable telephone switching apparatus in accordance with claim 7 wherein said telephone switching equipment includes cabling emanating from the rear side of said cabinet.

11. A wall-mountable telephone switching apparatus in accordance with claim 7 wherein said first and second hinge pin conduits are defined by a plurality of tubular retainers having substantially collinear central axes.

12. A wall-mountable telephone switching apparatus in accordance with claim 7 wherein each of said side brackets are generally planar and have tabs disposed substantially perpendicularly therefrom to facilitate attaching to said cabinet.

13. A wall-mounting apparatus in accordance with claim 7 wherein said cabinet may be rotated at least about 45° in either of two opposite directions depending upon which one of said first and second hinge pin assemblies is removed from its corresponding hinge pin conduit.

14. A method for attaching a telephone switching cabinet to a wall, said method comprising:
 mounting a wallmount bracket on a wall, said wallmount bracket including along opposite sides first and second wallmount hinge pin conduits;
 providing a first side bracket having along an edge thereof a first hinge pin pipe;
 aligning said first hinge pin conduit and said first hinge pin pipe;
 longitudinally inserting a first hinge pin assembly into said aligned first hinge pin conduit and first hinge pin pipe such that said first side bracket is generally rotatable about said first hinge pin assembly with respect to said wallmount bracket;
 providing a second side bracket having along an edge thereof a second hinge pin pipe;
 aligning said second hinge pin conduit and said second hinge pin pipe;
 longitudinally inserting a second hinge pin assembly into said aligned second hinge pin conduit and second hinge pin pipe such that said second side bracket is generally rotatable about said second hinge pin assembly with respect to said wallmount bracket;
 attaching said cabinet to each of said first and second side brackets along an edge opposite from said respective first and second hinge pin pipes.

15. A method in accordance with claim 14 comprising the additional final step of longitudinally removing one of said hinge pin assemblies from its corresponding hinge pin conduit and hinge pin pipe to permit said cabinet to be rotated about the other of said hinge pin assemblies and generally away from said wall.

16. A method in accordance with claim 14 wherein said telephone switching cabinet includes cabling emanating from said cabinet.

17. A method in accordance with claim 14 wherein said first and second hinge pin conduits are defined by a plurality of tubular retainers having substantially collinear central axes.

18. A method in accordance with claim 14 wherein each of said side brackets are generally planar and have tabs disposed substantially perpendicularly therefrom to facilitate attaching to said cabinet.

\* \* \* \* \*